United States Patent Office 3,542,673
Patented Nov. 24, 1970

3,542,673
RECOVERY OF C₃–C₅ CONSTITUENTS FROM NATURAL GAS BY COMPRESSING COOLING AND ADIABATIC AUTOREFRIGERATIVE FLASHING
William H. Ringler, Morristown, N.J., assignor to Esso Research and Engineering Company, a corporation of Delaware
Filed May 22, 1967, Ser. No. 639,996
Int. Cl. C10g 5/00; F25j 1/00
U.S. Cl. 208—340        8 Claims

ABSTRACT OF THE DISCLOSURE

A process for the recovery of light hydrocarbons from natural gas is described. The process requires the compression of a natural gas mixture into the region of the critical pressure of the gas mixture; the temperature of the mixture is then reduced and the mixture is further chilled via autorefrigeration by successive adiabatic flash stages. Simultaneous with the chilling, methane and ethane are removed from the mixture so that a $C_3$ to $C_5$ fraction may be readily recovered.

BRIEF SUMMARY OF THE INVENTION

Figure 1:
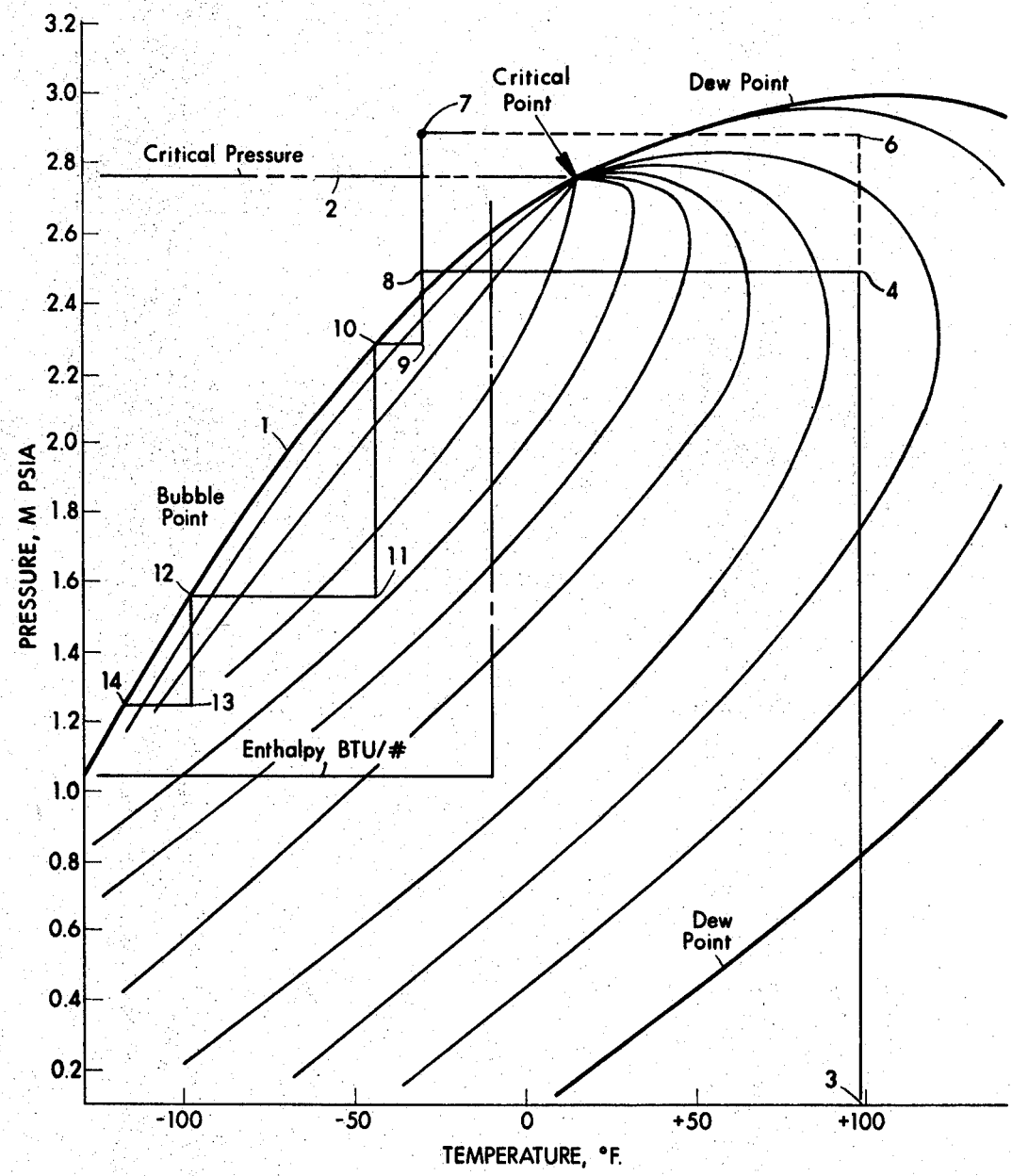

This invention relates to the recovery of light hydrocarbons from natural gas in a manner which is both economical and efficient. By natural gas is meant a mixture of lower hydrocarbons with components having a maximum molecular weight of about 114, descending down to methane. Typically, the gas contains about 5 to 20 vol. percent of $C_3$–$C_5$ hydrocarbons and about 65 to 85 vol. percent of methane and ethane. The recovery from this natural gas of a $C_3$–$C_5$ fraction is important for a variety of reasons. In areas where natural gas has little commercial value, the venting of the gas has been prohibited as has indiscriminate burning by various legislative bodies. Among the conservation techniques utilized widely is the compression of the natural gas to extremely high pressure levels, i.e., 2,000 to 3,000 p.s.i.g. and the injection of the gas back into the well. This provides a source of secondary crude oil recovery as well as satisfying laws relating to conservation and air pollution but is quite expensive.

In the processing of natural gases, it is also common to use a lean oil absorption system including the technique of refrigerating the lean oil for recovery of the more valuable propane and heavier hydrocarbons.

Recovery of light hydrocarbons by the use of a lean oil absorption system consists of contacting the natural gas with a light hydrocarbon oil such as kerosene or gas oil in a countercurrent treating tower. The lean oil preferentially removes the $C_3$ and heavier hydrocarbons from the natural gas. The absorption oil "rich" in $C_3$–$C_5$ hydrocarbons is sent to a de-ethanizer where the ethane and lighter components are removed from the oil. The oil is now "stripped" of the $C_3^+$ hydrocarbons, usually with steam or inert gas. The stripped oil is recycled to the absorption tower and the "stripped" components consisting of $C_3$–$C_5^+$ hydrocarbons are fractionated into propane (LPG) butanes ($C_4$'s) and natural gasoline ($C_5^+$).

Improved recovery of the $C_3$–$C_5$ hydrocarbons can be obtained if the absorption oil is refrigerated, i.e., by cooling the oil below ambient temperatures in the range of about 20° to 60° F.

Extremely large capital investment is required for the absorber-stripper installation which would be needed for lean oil systems. Accordingly, operating costs for such systems are quite high. A readily available alternative is the refrigeration of the natural gas at 600 through 1,000 p.s.i.a. to particularly low temperatures, in the vicinity of −100° to −150° F. in order to recover light hydrocarbons. Equipment costs are prohibitive in such an operation and, in addition, there is frequent failure due to the extremely low temperatures and high pressures utilized.

According to this invention, a method has unexpectedly been discovered by means of which light hydrocarbons may by recovered from high pressure natural gas systems by a combination of a standard refrigeration cycle combined with successive adiabatic flashes in which the condensate is refrigerated. In this manner, following the flashes, the $C_3$–$C_5$ hydrocarbons may be recovered by conventional means which in general would include a de-ethanizer to remove the ethane and lighter hydrocarbons from the stream. This step would be followed by fractionation of the heavier hydrocarbons into propane (LPG), butanes ($C_4$'s) and natural gasoline ($C_5^+$). However, in this process no stripper is required since there is no circulating lean oil.

Mixtures of light hydrocarbons such as those that exist in natural gas exhibit properties similar to pure components. For a pure component the critical temperature is defined as the temperature above which the gas cannot be liquefied regardless of the pressure applied. The critical pressure is defined as the pressure at which a gas can exist in equilibrium with a liquid at the critical temperature. The critical temperature and critical pressure are referred to as the critical point.

A critical temperature and pressure exist for mixtures. This is often referred to as the pseudo critical temperature and pseudo critical pressure. In general the pseudo critical temperature lies between the critical temperatures of major components. However, the critical pressure will be higher than that existing for any of the components present (see the drawing FIG. 1). In the region of the critical point and at pressures just below the critical pressure, this is in the two phase region.

Natural gas near its pseudo critical temperature and pressure exhibits an abnormal phase behavior. Slight changes of temperature of the gas system just below the critical pressure can drastically effect the quantity of vapor and liquid in equilibrium.

Initially, the natural gas to be processed is compressed. The quantity of $C_3$–$C_5$ hydrocarbon present will vary with the particular crude. Initially, the natural gas is compressed by standard compressing means to within plus or minus 500 p.s.i.a. of the critical pressure of the hydrocarbon mixture. The critical pressure for typical hydrocarbon mixtures to be treated by the instant invention will usually vary between 1600 p.s.i.a. and 3000 p.s.i.a. In FIG. 1 the critical pressure for a typical hydrocarbon mixture to be treated by this invention is shown where the critical pressure isobar crosses the bubble point curve, i.e., the critical point. After this compression, the natural gas is chilled to the region of the critical point where, as mentioned above, slight changes of temperature and pressure will drastically effect the quantity and composition of the vapor and liquid phases which exists at all times.

Initially, as indicated above, the natural gas is compressed into the region of its critical pressure. The critical pressure will vary between 1600 p.s.i.a. and 3000 p.s.i.a. and to recover the propane and heavier hydrocarbons the gas should be processed within plus or minus 500 p.s.i.a. of this level. Following this, the temperature of the gas mixture is reduced in order to condense all of a major portion of the hydrocarbons present. It is preferred to reduce the temperature to a level of −20° to −50° F. in order to achieve this condensation. At this point, the system is subjected to a series of about 4 to 10 adiabatic flash stages down to a pressure of no less than about 1,000 p.s.i.a. This pressure of no less than about 1,000 p.s.i.a. is desirable because it brings the temperature of the liquid and vapor to the region of −50° to −80° F. At this temperature the process does not require a great deal of alloy steel for construction and can still operate efficiently.

By using the fortifying liquid as discussed later, one allows the pressure of the system to be reduced to the 200–400 p.s.i.a. region and also brings the temperature of the liquid up to ambient temperature for subsequent recovery without undue loss of propane and butanes.

The autorefrigeration takes place by reducing the pressure in increments of about 20 to 200 p.s.i.a. per adiabatic stage. A series of adiabatic flashes is used rather than one stage since this gradual stepwise pressure reduction serves to enhance the separation of the methane and ethane from the heavier hydrocarbons. This series of adiabatic flashes will tend to reduce the amount of $C_3$–$C_5$ material which would tend to flash off with more gas if only one stage is used. It is much preferred to make use of autorefrigeration in these adiabatic flash stages since this substantially reduces the cost of operating this process. It is preferred to fortify the mixture after it has been reduced to a pressure of about 1000 to 1200 p.s.i.a.

Additionally, a simple propane or ammonia refrigeration system cannot get down to $-50°$ to $-80°$ F. These two refrigerants are capable of getting down into the $-25°$ to $-35°$ F. range. To get to a lower temperature another refrigerant such as ethylene or one of the Freons is required. However, these refrigerants do not condense at room temperature like propane and ammonia so that the condenser to these systems is another refrigeration system such as propane or ammonia. This is called a cascaded refrigeration system and is two refrigeration cycles combined to get down to a $-50°$ to $-80°$ F. range.

In the instant case, one refrigeration system is utilized to get down to $-25°$ to $-35°$ F. and autorefrigerate to a lower temperature by successively reducing the pressure on the system. To get to the lower temperature by refrigeration alone one would be forced to add the previously mentioned second refrigeration cycle.

The purpose of the fortifying liquid is to change the vapor-liquid equilibrium relationship in the autorefrigerated liquid hydrocarbons. The recovered liquids will consist principally of propane and butanes with smaller quantities of $C_5^+$ material. Dissolved in the liquid will be a substantial portion of methane and ethane. By adding the fortifying liquid, the equilibrium relationship between the methane and ethane and heavier hydrocarbons is changed in the direction of making the methane and ethane more volatile. The fortifying liquid consists of butanes and $C_5^+$ material collected earlier in the compression cycle or obtained from the fractionation step. The fortifying liquid also elevates the boiling point of the mixture making it possible to bring the autorefrigerated liquid at $-50°$ to $-80°$ F. and 1000 p.s.i.a. up to ambient temperatures and at a reduced pressure of 200 to 400 p.s.i.a. The final liquid is ready for conventional recovery by de-ethanization and fractionation without undue loss of the propanes and butanes.

A variety of fortifying liquids may be added to the system; a minimum weight of $C_4$ is recommended and preferably $C_5^+$ hydrocarbons should be added for the purpose of fortification. The quantity of liquid to be added may vary but it is recommended that 5 to 20 liquid volume percent is necessary for a successful separation. At this point, another series of adiabatic flashes is commenced. During this series, the pressure is reduced in a plurality, i.e., about 4 to 10 steps, down to 200 to 400 p.s.i.a. At this point, most of the methane and ethane has been flashed from the natural gas. In fact, about 60 to 80 liquid volume percent has been removed from the condensate and only 2 to 10 liquid volume percent of the original methane and ethane remains in admixture with the desired $C_3$–$C_5$ products. The $C_3^+$ fraction may then be stabilized by a conventional de-ethanizing technique. The individual hydrocarbon components are then easily recovered by means of distillation or other methods well known in the art.

Figure 2:
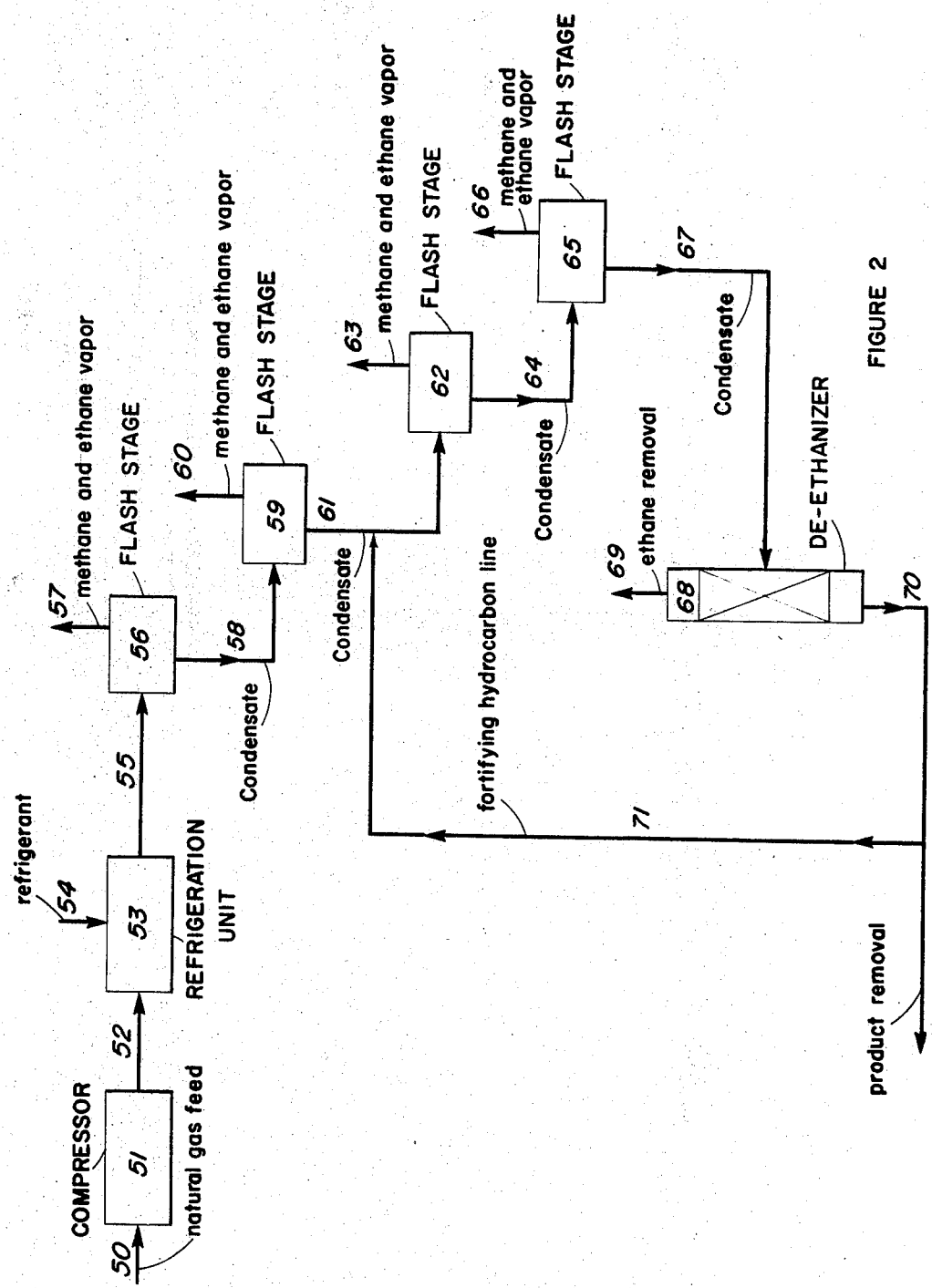

The attached FIG. 1 is a simplified pressure-temperature plot of the phase boundaries of a natural gas mixture. FIG. 2 is a schematic diagram illustrating the disclosed process. The invention may be more succinctly understood with reference to the figures.

DETAILED DESCRIPTION OF THE DRAWING

Line 1 in FIG. 1 designates the dome-shaped bubble point curve of a hydrocarbon mixture. Line 2 indicates the critical pressure, isobar, of the liquid. Within the dome a two-phase system exists in which the liquid and vapor at any point are in equilibrium. Above and to the left of line 1 but below the critical pressure isobar, this system is all liquid. A wide variety of systems may be treated and natural gas from substantially any source may be processed by the instant invention in order to recover the $C_3$–$C_5$ hydrocarbons. Particular sources of natural gas includes those associated with crude oil production and those from geological formations which are independent of crude oil production.

The gas is raised to a pressure of 1500 to 3000 p.s.i.a.; temperature is maintained at 90° to 100° F. The pressure of the gas system is increased from point 3 to point 4 in the figure. At intermediate compression stages the heavier hydrocarbons will condense. As the concentration of heavier hydrocarbons is removed from the gas mixture, the phase boundaries will tend to shift to the left which represents lower temperatures and pressures. At point 4 below the critical pressure, the gas mixture is dried and chilled to $-20°$ to $-50°$ F. by any standard refrigeration system such as ammonia, propane or Freon, until point 8 is reached, at which time the gas mixture is partially liquefied. If the compression level should first be raised to point 6 which is above the critical pressure isobar and the temperature is then lowered to point 7, a two-phase system will not exist until the pressure is reduced until at a level of point 8 which is at the bubble point curve.

The next step is the reduction of pressure in the liquid through a number of adiabatic flash stages. At each pressure level, heat is removed by the vaporizing of methane and ethane thus autorefrigerating the liquid portion remaining. This is designated in the figure by the path going from points 8 to 9, 9 through 10, 10 through 12 and finally 12 to point 14. The path from 8 to 14 is adiabatic. To represent this path more correctly, the abscissa is changed to indicate enthalpy as indicated by the superimposed horizontal line under the bubble point portion of the curve. With this change, the lines of constant liquid have no significance in the path of 8 to 14.

Representing the phase boundaries of a hydrocarbon mixture on a plane surface is difficult to do because of compositional changes in vapor-liquid equilibria during processing. The primary purpose of the figure is to supply a general picture of what is actually taking place. For example, the flash stages from 8 to 14 are shown with a fixed location for the bubble point curve. For hydrocarbon mixtures, the bubble point curve will shift to higher temperature as the lighter components are removed from each stage. The enthalpy of the mixture also continues to change.

Cold condensate comprising 10 to 40 liquid volume percent of the mixture when cooled to point 14 is mixed with natural condsenates previously collected at lower pressures which are comprised principally of butanes and heavier hydrocarbons and the total mixture goes through additional adiabatic flash stages followed by conventional de-ethanization and $C_3^+$ recovery as the final steps of the process.

The hydrocarbon mixture from the final flash stage is now charged to a reboiled de-ethanizer using natural gasoline from the debutanizer as reflux to remove the last traces of methane and ethane. The bottoms product from the de-ethanizer is charged to a depropanizer in which propane (LPG) is recovered as the overhead product and the bottoms is charged to a debutanizer. Butanes are recovered as the overhead product and natural gasoline is the bottoms product. Part of the natural gasoline product is used as a fortifying liquid and as the reflux to the de-ethanizer with the remainder going to product storage.

It should be emphasized that the heavier condensates which are comprised of butanes of heavier hydrocarbons may be added at any point from 8 to 14 and serve to fortify this mixture and sharpen the separation which takes place.

As the system attains equilibrium, the gases leaving the system will be methane and ethane with traces of propane. Depending on the gas composition, the critical pressure and temperature may shift appreciably to a lower temperature and pressure level. This may require fortifying the liquid gas in the first adiabatic flash stages to maintain the contour of the phase boundary. Otherwise effective condensation will not be possible in the temperature range of the standard refrigeration system provided.

FIG. 2 shows a schematic representation of the process. Natural gas in line 50 is introduced into a compressor or series of compressor 51 and compressed to within the vicinity of the critical pressure of the gas. Compressed gas in line 52 is then chilled in refrigeration unit 53, using a suitable refrigerant, e.g., propane, from line 54 so that all or a major portion of the gas is condensed. The condensed gas in line 55 is then fed to a series of adiabatic flashing stages (shown here as two stages but which can be 4 to 10 stages) wherein the pressure is reduced and the temperature lowered. Methane and ethane are recovered as vapors in lines 57 and 60 while the condensate is transferred from stage 56 through line 58 to stage 59 and line 61. A fortifying hydrocarbon in line 71 is admixed with the condensate in line 61 and fed to a second series of adiabatic flashing stages (again shown as two stages but which can be 4 to 10 stages) 62 and 65. Additional methane and ethane are recovered as vapors in lines 63 and 66 while the condensate is transferred through stage 62 to lnie 64 to stage 65 and line 67. The $C_3-C_5^+$ product in line 67 is then passed to de-ethanizer 68 where the last traces of ethane are removed via line 69 and the product is recovered in line 70. A portion of the product in line 71 may be recycled and used as the fortifying hydrocarbon.

Utilizing the system indicated above, 70 to 90 liquid volume percent of the $C_3-C_5$ hydrocarbons will be recovered from natural gas. With each adiabatic flash 10 to 40 liquid volume percent of the methane and ethane present will be removed from the condensed liquid for each flash the pressure should be lowered between about 20 and 200 p.s.i.a. Eventually, only about 3 to 10 liquid volume percent of the methane and ethane originally present in the gas is found admixed with the $C_3-C_5$. Usually about 4 to 10 adiabatic flashes are needed prior to adding the fortifying heavier hydrocarbons; in all, about 8 to 20 adiabatic flashes are needed prior to conventional recovery of the propane and heavier hydrocarbons.

Example

In a specific example of the instant invention, a natural gas associated with a Venezuelan crude is utilized. About 200 million standard cubic feet of the natural gas is subjected to the process of the instant invention. Initially, the gas is compressed by means of a series of centrifugal compressors to a pressure of about 2500 p.s.i.a. at a temperature of about 95° F. The gas contains about 79.1 volume percent of methane, about 8.1 volume percent of ethane, about 5.0 volume percent of propane, about 3.0 volume percent of butane and about 1.3 volume percent of pentane and about 0.9 volume percent of hexane and heavier hydrocarbons. The gas is refrigerated to —25° F. and then subjected to a series of 4 adiabatic flashing stages in order to chill the liquid mixture to —70° F. In the first stage, the mixture is chilled to a temperature of —35° F. after the pressure has been lowered to 1650 p.s.i.a. In the next adiabatic flash, the temperature is lowered to about —50° F. by lowering the pressure to 1240 p.s.i.a. In the first step, about 40 volume percent of the methane and ethane in the liquid is flashed from the system; in the second step, about 30 volume percent of the remaining methane and ethane is flashed. At this point, prior to the next adiabatic flash, the mixture of liquid hydrocarbons is fortified with about 15 liquid volume percent based on the remaining liquid of a heavier hydrocarbon which is butanes and pentanes. Following this there are two more adiabatic flashes. In the first flash after fortification, the pressure is reduced to 850 p.s.i.a. and the temperature is reduced to —60° F. This results in the removal of 30% by volume of the remaining methane and ethane. The liquid is then heated by exchange with heavier liquids used to fortify the mixture to a temperature of 10° F.

In the final adiabatic flash the temperature of the mixture is lowered to —20° F. by lowering the pressure to 400 p.s.i.a. About 90 volume percent of the total methane and ethane has been removed by flashing. The remaining mixture contains about 70 volume percent of the original $C_3-C_5$ fraction and about 3 volume percent of the original methane and ethane fraction. The mixture is then subjected to de-ethanization by means of reboiled de-ethanizer using chilled natural gasoline from the debutanizer as the refluxing solevnts. At this point, substantially all that remains is the $C_3-C_5^+$ fraction and these hydrocarbons may then be separated in propane (LPG), butanes ($C_4$) and natural gasoline. These products may then be sold as such or used as raw materials for further processing.

Although this invention has been described with some degree of particularity, it is intended to be limited only by the attached claims.

What is claimed is:

1. A process for removing the $C_3-C_5$ constituent from a natural gas, said natural gas also containing methane and ethane which consists essentially of compressing said gas to a pressure within about 500 p.s.i.a. of the critical pressure of said gas, cooling said gas to a point at least below the critical temperature of said gas, thereby condensing at least a major portion of said gas, chilling said condensed gas by a series of adiabatic autorefrigerative flashing stages by lowering the pressure over said condensed gas and vaporizing at least a portion of the methane and ethane present, admixing a fortifying liquid to the remaining condensed gas, subjecting said mixture to a further series of adiabatic autorefrigerative flashing stages and recovering a stream enriched in the $C_3-C_5$ fraction.

2. The process of claim 1 wherein said fortifying liquid is a hydrocarbon in the range of $C_4-C_{10}$.

3. A process for removing the $C_3-C_5$ constituent from a natural gas, said natural gas also containing methane and ethane which consists essentially of compressing said gas to a pressure between 1600 p.s.i.a. and 3000 p.s.i.a., cooling said gas to a point at least below the critical temperature of said gas, thereby condensing at least a major portion of said condensed gas to a series of adiabatic autorefrigerative flashing stages by lowering the pressure of said condensed gas about 20–200 p.s.i.a. per stage and vaporizing at least a portion of the methane and ethane present, reducing the pressure of said gas to a maximum level of about 1000 p.s.i.a., admixing a $C_4-C_{10}$ fortifying liquid with the remaining condensed gas, subjecting said mixture to further adiabatic autorefrigerative flashing stages and recovering a stream enriched in the $C_3-C_5$ fraction.

4. The process of claim 3 wherein said mixture is subjected to a de-ethanization step prior to the recovery of the $C_3-C_5$ fraction.

5. The process of claim 3 wherein the temperature of the natural gas is reduced to a level of about —20° to —50° F. before the first adiabatic flashing stages.

6. A process for removing the $C_3-C_5$ constituent from a natural gas, said natural gas also containing methane and ethane which consists essentially of compressing said gas to a pressure between about 1600 p.s.i.a. and 3000 p.s.i.a., cooling said gas to a point at least below the critical temperature of said gas, thereby condensing at least a major portion of said gas, chilling said condensed gas by a series of adiabatic autorefrigerative flashing stages by lowering the pressure of said condensed gas between about 20 and 200 p.s.i.a. per stage and vaporizing at least a portion of the methane and ethane present, admixing a $C_4$-$C_{10}$ fortifying liquid with the remaining condensed gas before a pressure level of about 1000 p.s.i.a. has been reached, subjecting said mixture to a second series of adiabatic autorefrigerative flashing stages in which said pressure is lowered to a level in which substantially all of the methane and ethane which is capable of being flashing from the system is removed, and recovering a stream enriched in $C_3$-$C_5$ hydrocarbons.

7. The process of claim 6 in which the mixture is subjected to a de-ethanizing step prior to the recovery of the $C_3$-$C_5$ product.

8. The process of claim 6 in which recycled hydrocarbons, recovered from the $C_3$-$C_5$ product, is utilized as the fortifying liquid.

References Cited

UNITED STATES PATENTS

| | | |
|---|---|---|
| 2,973,834 | 3/1961 | Cicalese. |
| 3,160,489 | 12/1964 | Brocoff et al. _____ 62—23 XR |
| 3,203,191 | 8/1965 | French _____ 62—38 XR |
| 3,262,278 | 7/1966 | Thorsten _____ 62—28 XR |
| 3,342,037 | 9/1967 | Kniel _____ 62—23 |
| 3,360,945 | 1/1968 | Thornton _____ 62—23 XR |
| 2,601,599 | 6/1952 | Deming _____ 62—16 XR |

OTHER REFERENCES

Retrograde Condensation, by Donald L. Katz and Frederick Kurata, Industrial and Engineering Chemistry, June 1940, pp. 817–827.

WILBUR L. BASCOMB, JR., Primary Examiner

U.S. Cl. X.R.

62—9, 16, 20, 23 24 27; 202—173; 203—88